United States Patent
Chen (10) Patent No.: US 8,942,977 B2
(45) Date of Patent: Jan. 27, 2015

(54) SYSTEM AND METHOD FOR SPEECH RECOGNITION USING PITCH-SYNCHRONOUS SPECTRAL PARAMETERS

(71) Applicant: Chengjun Julian Chen, White Plains, NY (US)

(72) Inventor: Chengjun Julian Chen, White Plains, NY (US)

( * ) Notice: Subject to any disclaimer, the term of this patent is extended or adjusted under 35 U.S.C. 154(b) by 0 days.

(21) Appl. No.: 14/216,684

(22) Filed: Mar. 17, 2014

(65) Prior Publication Data

US 2014/0200889 A1 Jul. 17, 2014

Related U.S. Application Data (63) Continuation-in-part of application No. 13/692,584, filed on Dec. 3, 2012, now Pat. No. 8,719,030.

(51) Int. Cl.
| | |
|---|---|
| *G10L 15/00* | (2013.01) |
| *G10L 15/02* | (2006.01) |
| *G10L 25/90* | (2013.01) |
| *G10L 25/93* | (2013.01) |

(52) U.S. Cl.
CPC ............ *G10L 15/02* (2013.01); *G10L 25/90* (2013.01); *G10L 25/93* (2013.01)
USPC ........................................ 704/235; 704/254

(58) Field of Classification Search
CPC ............................. G10L 15/02; G10L 15/04
USPC .......................... 704/254, 235, 256
See application file for complete search history.

(56) References Cited

U.S. PATENT DOCUMENTS

| | | | | |
|---|---|---|---|---|
| 5,917,738 | A | * | 6/1999 | Pan .............................. 708/403 |
| 6,311,158 | B1 | * | 10/2001 | Laroche ....................... 704/269 |
| 6,470,311 | B1 | * | 10/2002 | Moncur ........................ 704/208 |
| H2172 | H | * | 9/2006 | Staelin et al. ................. 704/207 |

OTHER PUBLICATIONS

Hess, Wolfgang. "A pitch-synchronous digital feature extraction system for phonemic recognition of speech." Acoustics, Speech and Signal Processing, IEEE Transactions on 24.1 (1976): 14-25.*
Mandyam, Giridhar, Nasir Ahmed, and Neeraj Magotra. "Application of the discrete Laguerre transform to speech coding." Asilomar Conference on Signals, Systems and Computers. IEEE Computer Society, 1995.*
Legát, Milan, J. Matoušek, and Daniel Tihelka. "On the detection of pitch marks using a robust multi-phase algorithm." Speech Communication 53.4 (2011): 552-566.*
Wikipedia entry for tonal languages (Dec. 15, 2011).*

* cited by examiner

*Primary Examiner* — Vincent P Harper (57) ABSTRACT

The present invention defines a pitch-synchronous parametrical representation of speech signals as the basis of speech recognition, and discloses methods of generating the said pitch-synchronous parametrical representation from speech signals. The speech signal is first going through a pitch-marks picking program to identify the pitch periods. The speech signal is then segmented into pitch-synchronous frames. An ends-matching program equalizes the values at the two ends of the waveform in each frame. Using Fourier analysis, the speech signal in each frame is converted into a pitch-synchronous amplitude spectrum. Using Laguerre functions, the said amplitude spectrum is converted into a unit vector, referred to as the timbre vector. By using a database of correlated phonemes and timbre vectors, the most likely phoneme sequence of an input speech signal can be decoded in the acoustic stage of a speech recognition system.

12 Claims, 9 Drawing Sheets

SYSTEM AND METHOD FOR SPEECH RECOGNITION USING PITCH-SYNCHRONOUS SPECTRAL PARAMETERS

The present application is a continuation in part of patent application Ser. No. 13/692,584, entitled "System and Method for Speech Synthesis Using Timbre Vectors", filed Dec. 3, 2012, by inventor Chengjun Julian Chen.

FIELD OF THE INVENTION

The present invention generally relates to automatic speech recognition, in particular to automatic speech recognition using pitch-synchronous spectral parameters, for example in particular timbre vectors.

BACKGROUND OF THE INVENTION

Speech recognition is an automatic process to convert the voice signal of speech into text, which has three steps. The first step, acoustic processing, reduces the speech signal into a parametric representation. The second step is to find the most possible sequences of phonemes from the said parametrical representation of the speech signal. The third step is to find the most possible sequence of words from the possible phoneme sequence and a language model. The current invention is related to a new type of parametric representation of speech signal and the process of converting speech signal into that parametric representation.

In current commercial speech recognition systems, the speech signal is first multiplied by a shifting process window, typically a Hamming window of duration about 25 msec and a shifts about 10 msec, to form a frame, see FIG. 2(A). A set of parameters is produced from each windowed speech signal. Therefore, for each 10 msec, a set of parameters representing the speech signal in the 25 msec window duration is produced. The most widely used parameter representations are linear prediction coefficients (LPC) and mel-frequency cepstral coefficients (MFCC). Such a method has flaws. First, the positions of the processing windows are unrelated to the pitch periods. Therefore, pitch information and spectral information cannot be cleanly separated. Second, because the window duration is typically 2.5 times greater that the shift time, a phoneme boundary is always crossed by two or three consecutive windows. In other words, large number of frames cross phoneme boundaries, see FIG. 2(A).

A better way of parameterizing the speech signal is first to segment the speech signals into frames that are synchronous to the pitch periods, see FIG. 2(B). For voiced section of the speech signals, 211, each frame is a single pitch period, 213. For unvoiced signals, 212, the frames 214 are segmented for convenience, typically into frames approximately equal to the average pitch periods of the voiced sections. The advantages of the pitch-synchronous parameterization are: First, the speech signal in a single frame only represent the spectrum or timbre of the speech, decoupled from pitch. Therefore, timbre information is cleanly separated from pitch information. Second, because a phoneme boundary must be either a boundary between a voiced section and an unvoiced section, or at a pitch-period boundary, each frame has a unique phoneme identity. Therefore, each parameter set has a unique phoneme identity. The accuracy of speech recognition can be improved. (See Part E of Springer Handbook of Speech Processing, Springer Verlag 2008).

SUMMARY OF THE INVENTION

The present invention defines a pitch-synchronous parametrical representation of the speech signals as the basis for speech recognition, and discloses methods of generating the said pitch-synchronous parametrical representation from speech signals, in particular timbre vectors.

Figure 1:
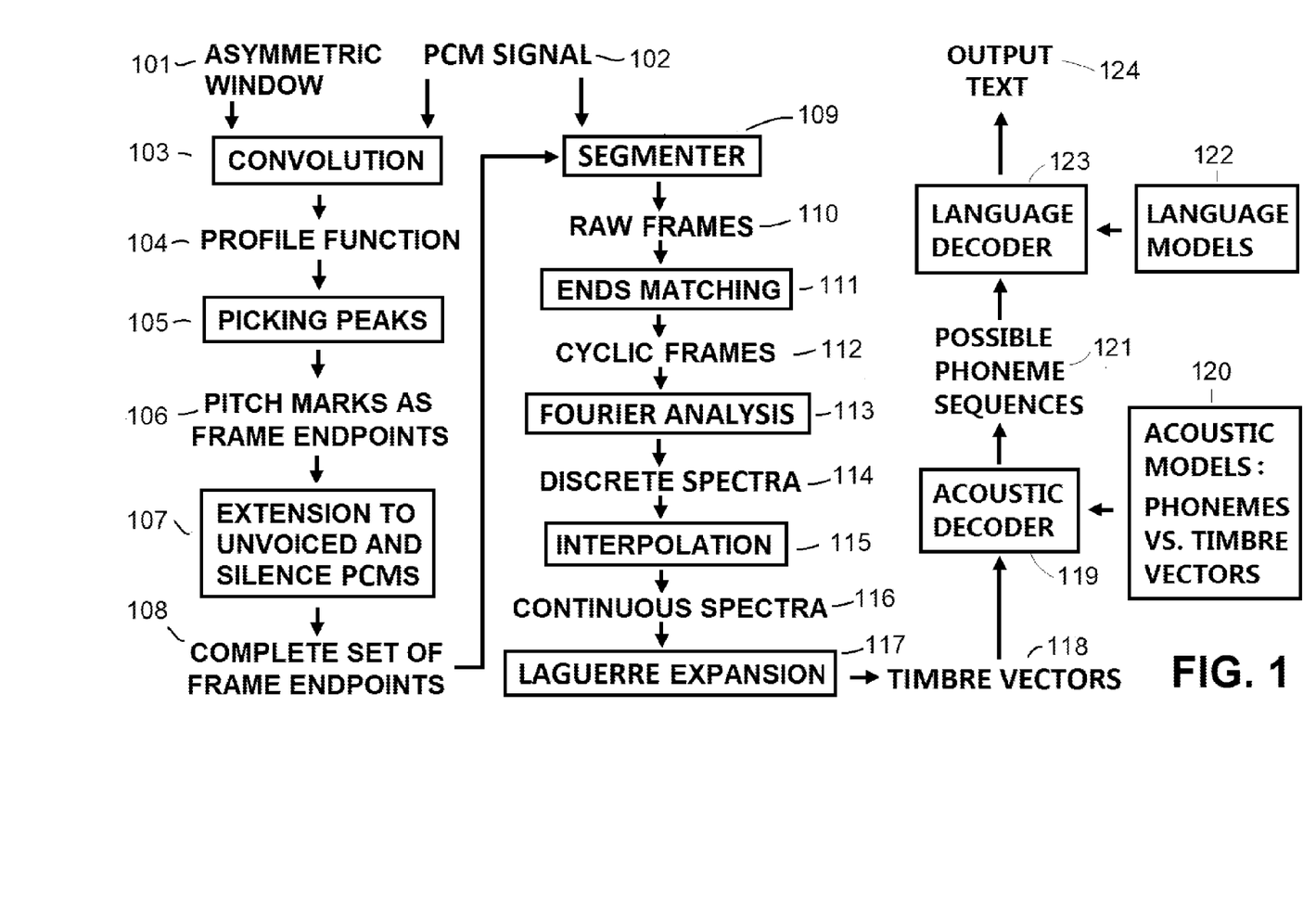
FIG. 1 is a block diagram of a speech recognition systems using pitch-synchronous spectral parameters.

According to an exemplary embodiment of the invention, see FIG. 1, a speech signal is first going through a pitch-marks picking program to pick the pitch marks. The pitch marks are sent to a process unit to generate a complete set of segmentation points. The speech signal is segmented into pitch-synchronous frames according to the said segmentation points. An ends-meeting program is executed to make the values at the two ends of every frame equal. Using Fourier analysis, the speech signal in each frame is converted into a pitch-synchronous amplitude spectrum, then Laguerre functions are used to convert the said pitch-synchronous amplitude spectrum into a unit vector characteristic to the instantaneous timbre, referred to as the timbre vector. Those timbre vectors constitute the parametrical representation of the speech signal.

Using recorded speech by a speaker or a number of speakers reading a prepared text which contains all phonemes of the target language, an acoustic database can be formed. The speech signal of the read text is converted into timbre vectors. The phoneme identity of each timbre vector is determined by correlating to the text. The average timbre vector and variance for each individual phoneme is collected from the paired record, which forms an acoustic database.

During speech recognition, the incoming speech signal is first converted into a sequence of timbre vectors. Those timbre vectors are then compared with the timbre vectors in the database to find the most likely phoneme sequence. The possible phoneme sequence is then sent to a language decoder to find out the most likely text.

DETAILED DESCRIPTION OF THE INVENTION

Various exemplary embodiments of the present invention are implemented on a computer system including one or more processors and one or more memory units. In this regard, according to exemplary embodiments, steps of the various methods described herein are performed on one or more computer processors according to instructions encoded on a computer-readable medium.

FIG. 1 is a block diagram of the automatic speech recognition system according to an exemplary embodiment of the present invention. The input signal 102, typically in PCM (pulse-code modulation) format, is first convoluted with an asymmetric window 101, to generate a profile function 104. The peaks 105 in the profile function, with values greater than a threshold, are assigned as pitch marks 106 of the speech signal, which are the frame endpoints in the voice section of the input speech signal 102. The pitch marks only exist for the voiced sections of the speech signal. Using a procedure 107, those frame endpoints are extended into unvoiced and silence sections of the PCM signal, typically by dividing those sections with a constant time interval roughly equals to the average pitch period in the voiced sections. A complete set of frame endpoints 108 is generated. Through a segmenter 109, using the said frame endpoints, the PCM signal 102 is then segmented into raw frames 110. In general, the PCM values of the two ends of a raw frame do not match. By performing Fourier analysis on those raw frames, artifacts would be generated. An ends-matching procedure 111 is applied on each raw frame to convert it into a cyclic frame 112 which can be legitimately treated as a sample of a continuous periodic function. Then, Fourier analysis 113 is applied to each said frame 112 to generate amplitude Fourier coefficients 114. According to the sampling theorem, the number of points of the amplitude spectrum is one half of the number of points of each frame. Therefore, it is a discrete amplitude spectrum. Using an interpolation procedure 115, the discrete amplitude spectrum is extended to a large number of points on the frequency axis, typically 512 or 1024 points, to generate a virtually continuous spectral function. The continuous spectral function is then expanded using Laguerre functions, 117, to generate a set of expansion coefficients. The Laguerre expansion coefficients constitute a timbre vector 118 of the said frame 112. The timbre vector 118 contains precise information of the timbre of the frame. Through those said timbre vectors, a timbre distance between two frames can be accurately defined.

The set of the said timbre vectors 118 are sent to the remaining part of the speech recognition engine, 119 through 124. In the acoustic decoder 119, the timbre vectors are compared with a database comprising a correlation tables of phonemes or subphoneme units versus timbre vectors. A number of most likely phoneme sequences 121 is generated. The most likely phoneme sequence 121 is sent to language decoder 123, assisted with language model 122, to find the most likely output text 124.

The fundamental difference of the present invention from prior arts is the way of segmenting speech signals into frames, see FIG. 2(A). In prior-art speech recognition systems, the speech signals 201 and 202 are first multiplied by a shifting process window 203, typically a Hamming window of duration about 25 msec and a shifts about 10 msec, to form a frame. A set of parameters is produced from each windowed speech signal. Therefore, for each 10 msec, a set of parameters representing the speech signal in the 25 msec window duration is produced. The most widely used parameter representations are linear prediction coefficients (LPC) and mel-frequency cepstral coefficients (MFCC). Such a method has flaws. First, the position of the processing window is unrelated to the pitch periods. Pitch information and timbre information cannot be separated cleanly. Second, many frames 203 cross phoneme boundaries, as shown in FIG. 2(A), some frames cross the boundary of voiced section 201 and unvoiced section 202.

The present invention starts with a different segmentation method. see FIG. 2(B). The speech signals 211 and 212 are first segmented into frames that are synchronous to pitch periods, 213 and 214. For voiced sections of the speech signal, 211, each frame is a single pitch period, 213. For unvoiced signals, 212, the frames 214 are segmented for convenience, typically into frame sizes approximately equal to the average pitch periods of the voiced sections. The advantages of the pitch-synchronous parameterization are: First, the speech signal in a single frame only represent the spectrum or timbre of the speech, decoupled from pitch. Therefore, timbre information is cleanly separated from pitch information. Second, because a phoneme boundary must be either a boundary between a voiced section and an unvoiced section, or at a pitch-period boundary, each frame has a unique phoneme identity, and therefore, each parameter set has a unique phoneme identity. The accuracy of speech recognition can be improved. (See Part E of Springer Handbook of Speech Processing, Springer Verlag 2008).

To segment the speech signal into pitch-synchronous frames, one known method is to rely on the simultaneously acquired electroglottograph (EGG) signals. For speech recognition, in most cases there is no electroglottograph instrument. However, to segment the speech signals into pitch-synchronous frames, one does not require the exact glottal closure instants. It only requires the identification of a section in a pitch period where the variation is weak. Based on the observed waveforms, a method to identify the weakly varying section in a pitch period is designed. It is based on the fact that at the starting moment of a pitch period, the signal variation is the greatest. Therefore, by convoluting the speech signal with a asymmetric window function w(n) shown in FIG. 3, the location with weakest variation can be found. An example of asymmetric window function is defined on an interval (−N<n<N), with a formula $$w(n) = \pm \exp\left\{-\frac{\pi^2}{N^2}n^2\right\}\sin\left(\frac{\pi n}{N}\right).$$

Figure 3:
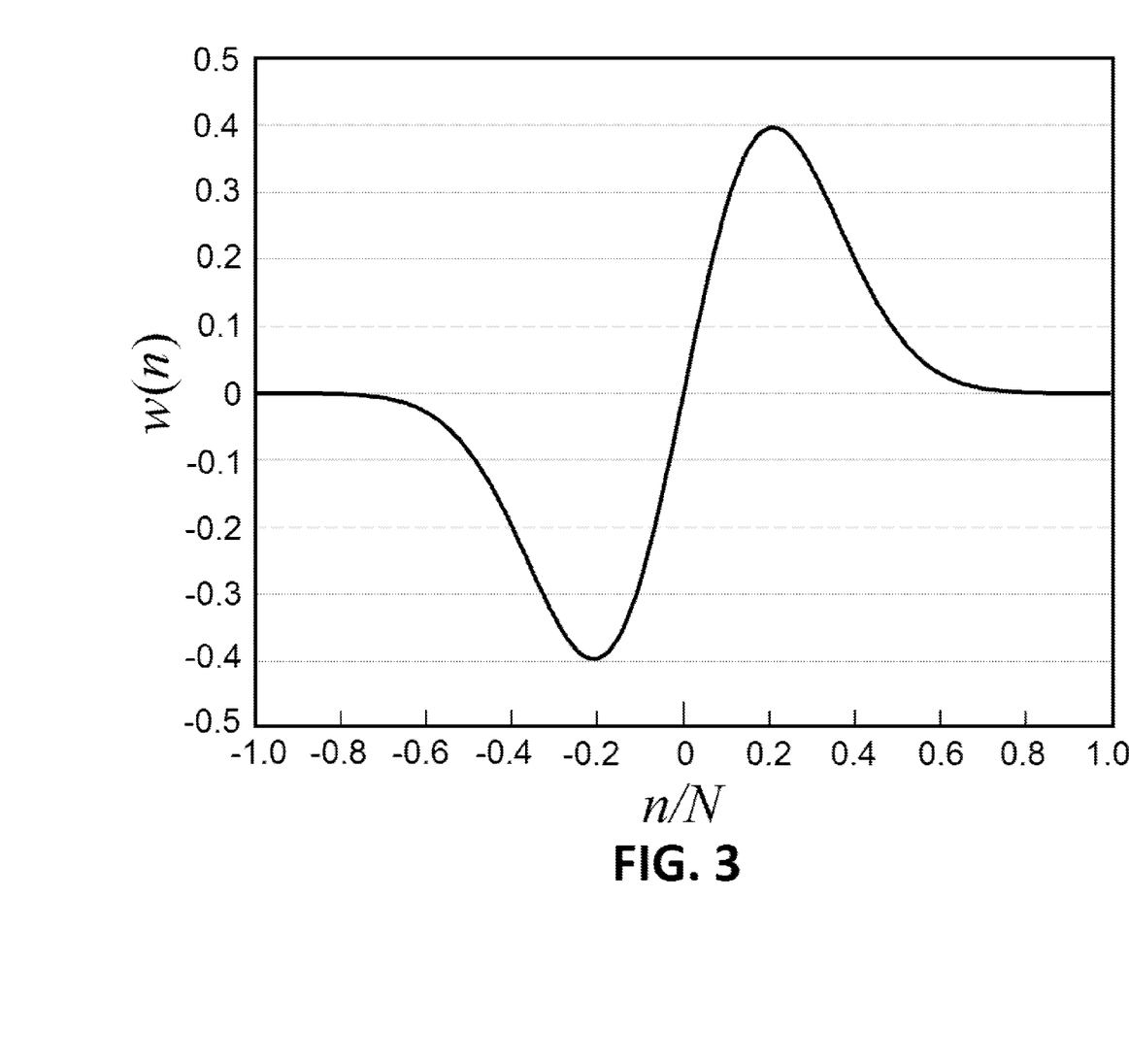
FIG. 3 is an example of the asymmetric window for finding pitch marks.

The ± sign is used to accommodate the polarity of the pcm signals. If a positive sign is taken, the value is positive for 0<n<N, but becomes zero at n=N; and it is negative for −N<n<0, again becomes zero at n=−N. Denoting the pcm signal as p(n), A profile function is generated $$f(m) = \sum_{n=-N}^{n<N} w(n)[p(m+n) - p(m+n-1)].$$

Figure 4:
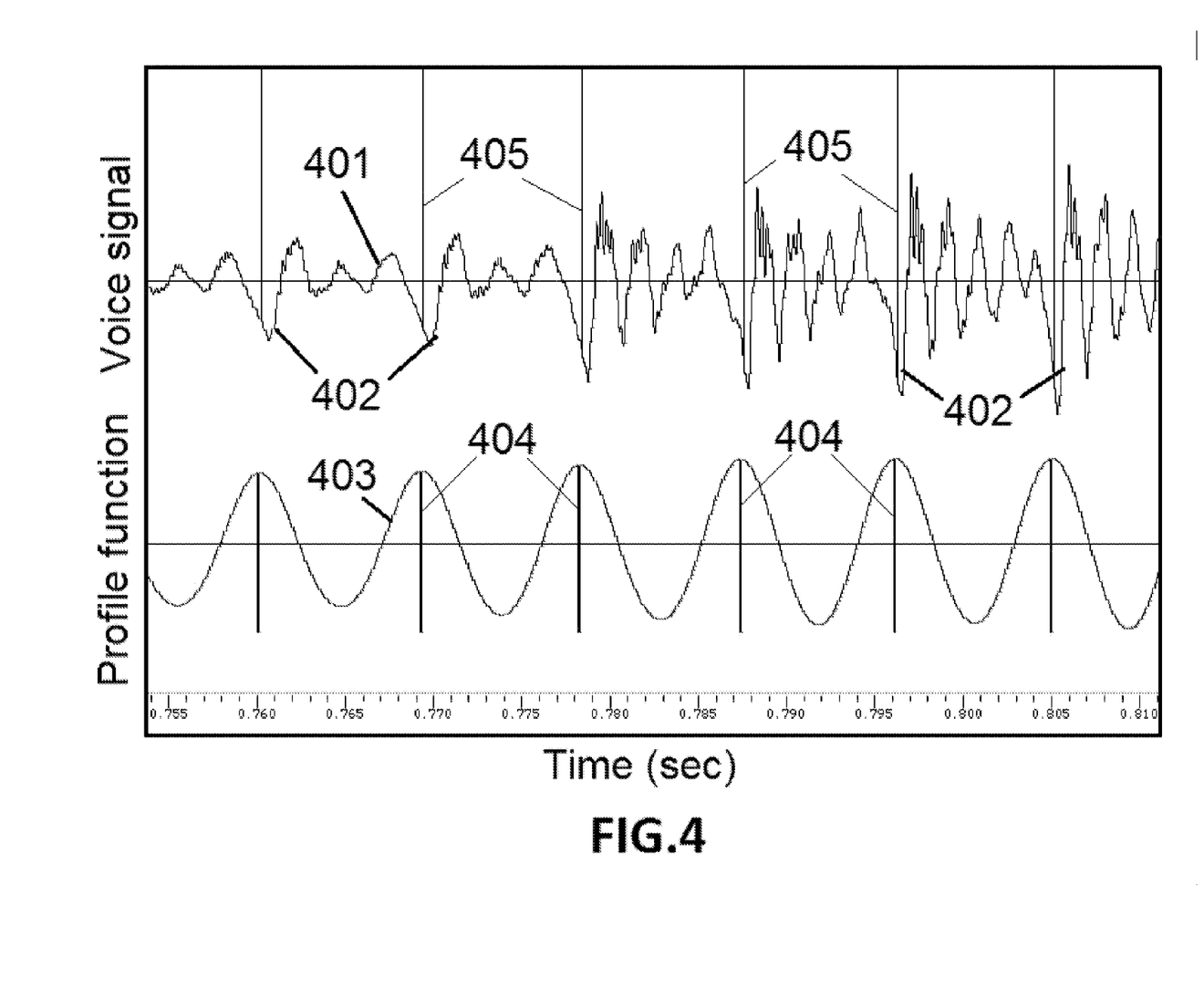
FIG. 4 is an example of the profile function for finding the pitch marks.

Typical result is shown in FIG. 4. Here, 401 is the voice signal. 402 indicates the starting point of each pitch period, where the variation of signal is the greatest. 403 is the profile function generated using the asymmetric window function w(n). As shown, the peak positions 404 of the profile function 403 are pointing to the locations with weak variation 405. The reason why this simple method works is also shown in FIG. 4: Each pitch period starts with a large variation of pcm signal at 402. The variation decreases gradually and becomes weak near the end of each pitch period.

Figure 5:
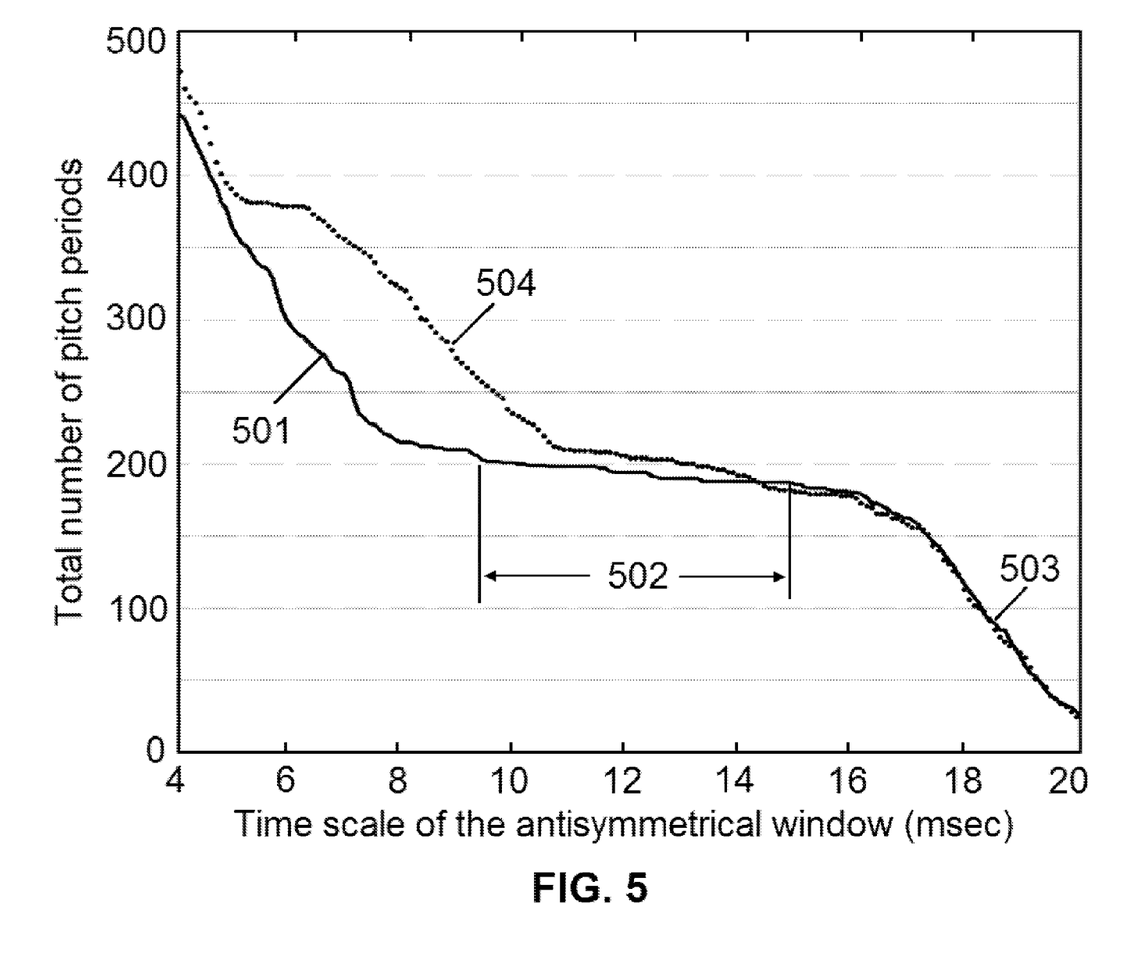
FIG. 5 is a chart of number of pitch marks as a function of the window scale for optimizing the window scale.

In order to generate accurate results, the size of the window, N, should be properly chosen. This can be done with a simple test: For a sentence of a given speaker, do the pitch mark finding procedure with a number of different widths N, and count the total number of pitch marks thus generated. If the polarity is correct, for a broad range of window scales, the total number of pitch marks should be stable, within a few percents. FIG. 5 shows a typical result. 501 is a curve with the correct polarity. When the window size it too small, there are many spurious pitch marks, shown in 501. When the window scale is approximately correct, 502, there is a wide range of window scales where the output is stable, here from 9 msec to 15 msec. Choosing a window size of 12 msec is good. If the window scale is too large, 503, the number of pitch marks reduces quickly. If the polarity is incorrect, 504, for relatively small window scales, the number of spurious pitch marks increases rapidly. With a wrong polarity, the pitch mark is in the middle of a pitch period. Therefore, the test can also determine the correct polarity.

Figure 6:
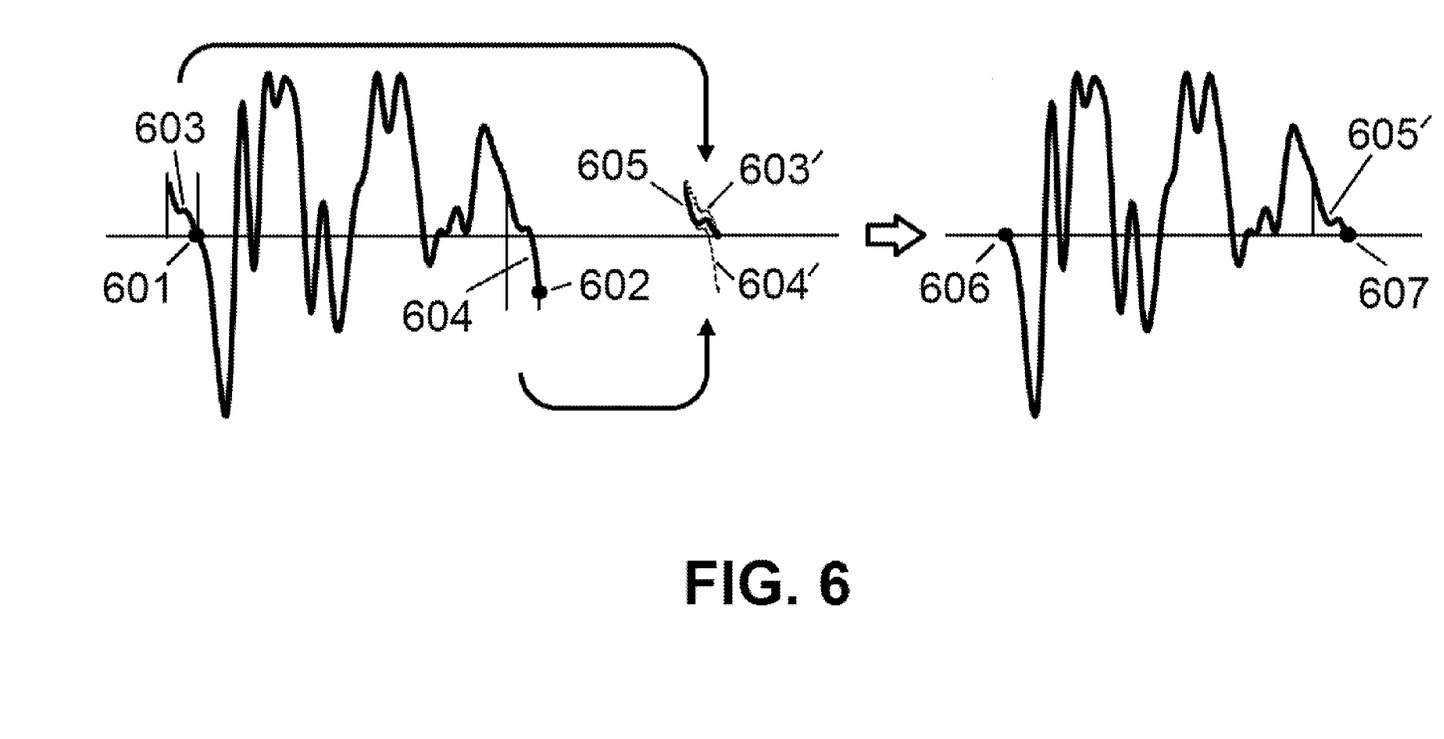
FIG. 6 shows the ends-meeting program to equalize the values of two ends of the waveform in a pitch period.

As shown in FIG. 4, values of the voice signal at two adjacent pitch marks, for example two adjacent 405 points, may not match. The following is an algorithm to equalize the ends. Let the number of sampling points between two adjacent pitch marks be N, and the original voice signal be $x_0(n)$. The smoothed signal $x(n)$ in a small interval $0<n<M$ is defined as $$x(N-n) = x_0(N-n)\frac{n}{M} + x_0(-n)\frac{M-n}{M}.$$

Where M is about N/10. Otherwise $x(n)=x_0(n)$. FIG. 6 shows an example. The starting pcm 601 and the end pcm 602 of the original waveform do not match. Fourier analysis cannot be done. By cutting a small section of waveform 603 from the previous pitch period, making a linear interpolation with the small section at the end of the current pitch period 604 to make a new small section 605, to replace the small section 604 in the original waveform, as shown in the right-hand side waveform, the new ends 606 and 607 are matched. Because the ends-matching is executed in the weakly varying region, the disturbance to the spectrum is negligible.

Figure 2:
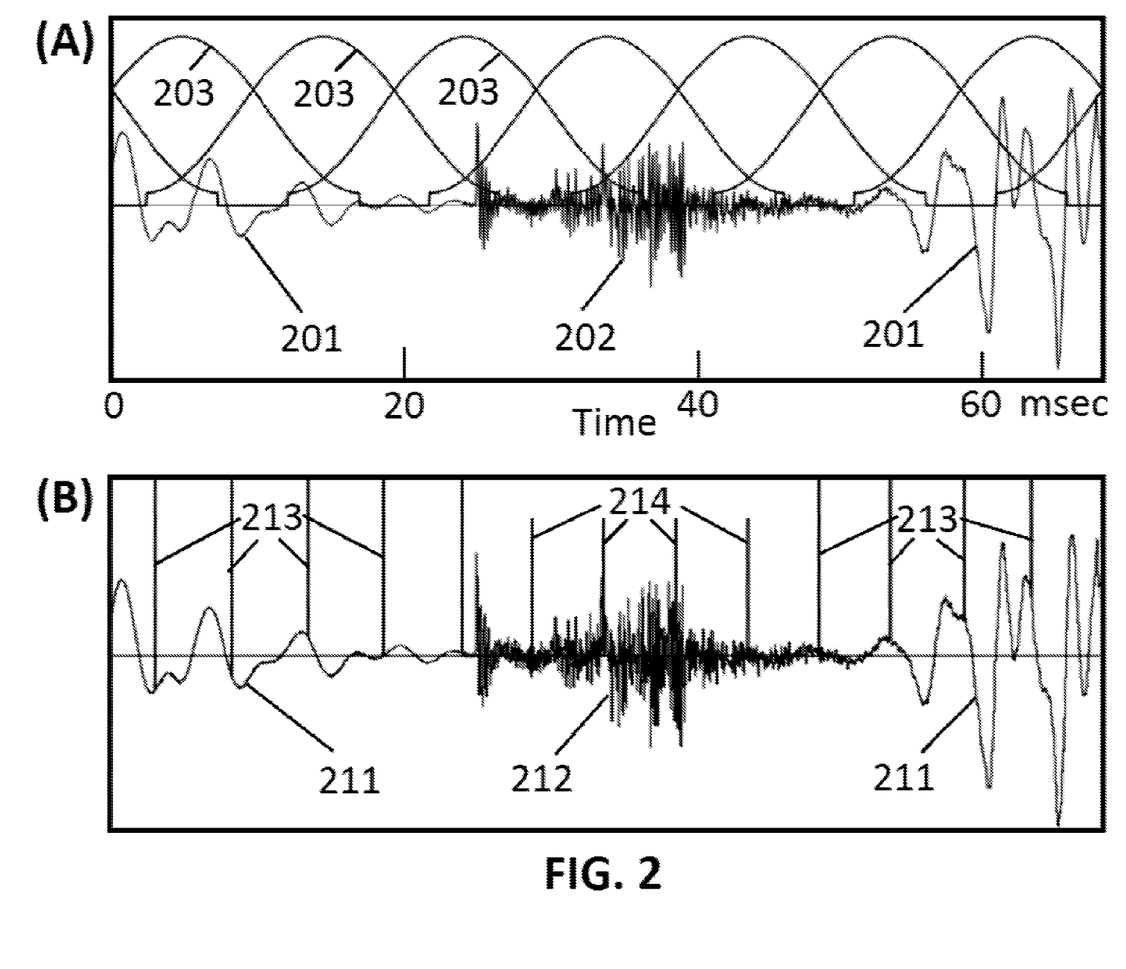
FIG. 2 shows the fundamental difference between the prior-art signal processing methods using a overlapping and shifting process window and the pitch-synchronous method of the present invention.

For unvoiced sections, see 212 of FIG. 2, the signals are segmented for convenience. For example, an unvoiced section is segmented into frames of sizes approximately equal to the average pitch periods in the voiced sections, see 212 in FIG. 2. An ends-matching procedure is also applied to the unvoiced frames.

Figure 7:
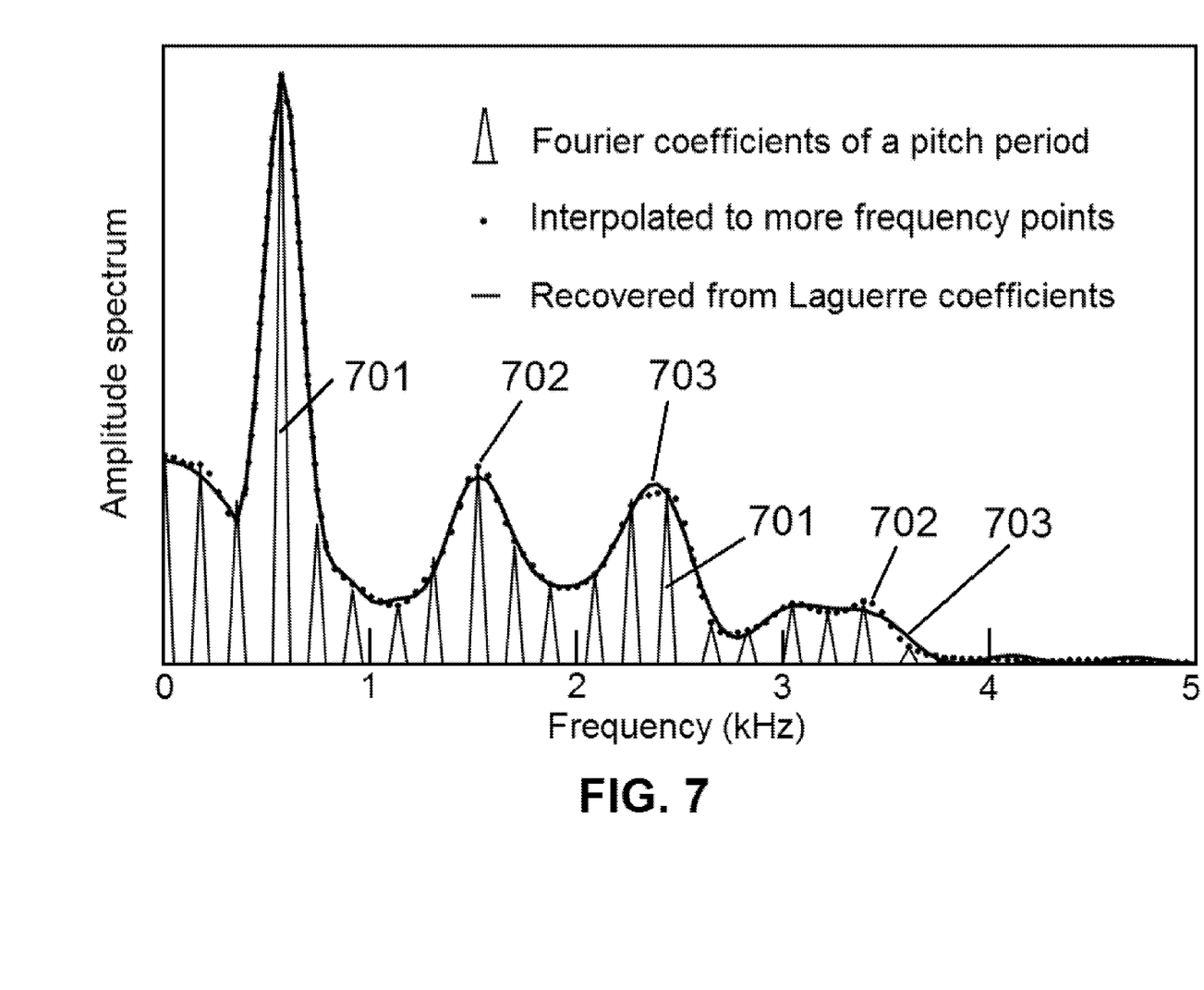
FIG. 7 is an example of amplitude spectrum in a pitch period, including the raw data, those after interpolation, and those recovered from a Laguerre transform function expansion.

After the ends are matched, 606 and 607, the waveform in a frame is processed by Fourier analysis to generate an amplitude spectrum, see FIG. 7. Because the number of points in a pitch period is finite, according to the sampling theorem, the number of amplitude spectrum is one half of the number of points in a pitch period, see 701 of FIG. 7. For the conversion into timbre vectors using numerical integration, the discrete points 701 is interpolated by various methods, including quadratic, cubic, and the Whittaker-Shannon algorithm, into many more points in the frequency axis, represented by the dotted curve 702. The continuous spectrum is expanded using Laguerre functions to generate a set of Laguerre expansion coefficients, which constitute a timbre vector. The continuous amplitude spectrum can be recovered from the timbre vectors with high accuracy, 703. Therefore, the timbre vector represents the amplitude spectrum with high accuracy, see following.

Figure 8:
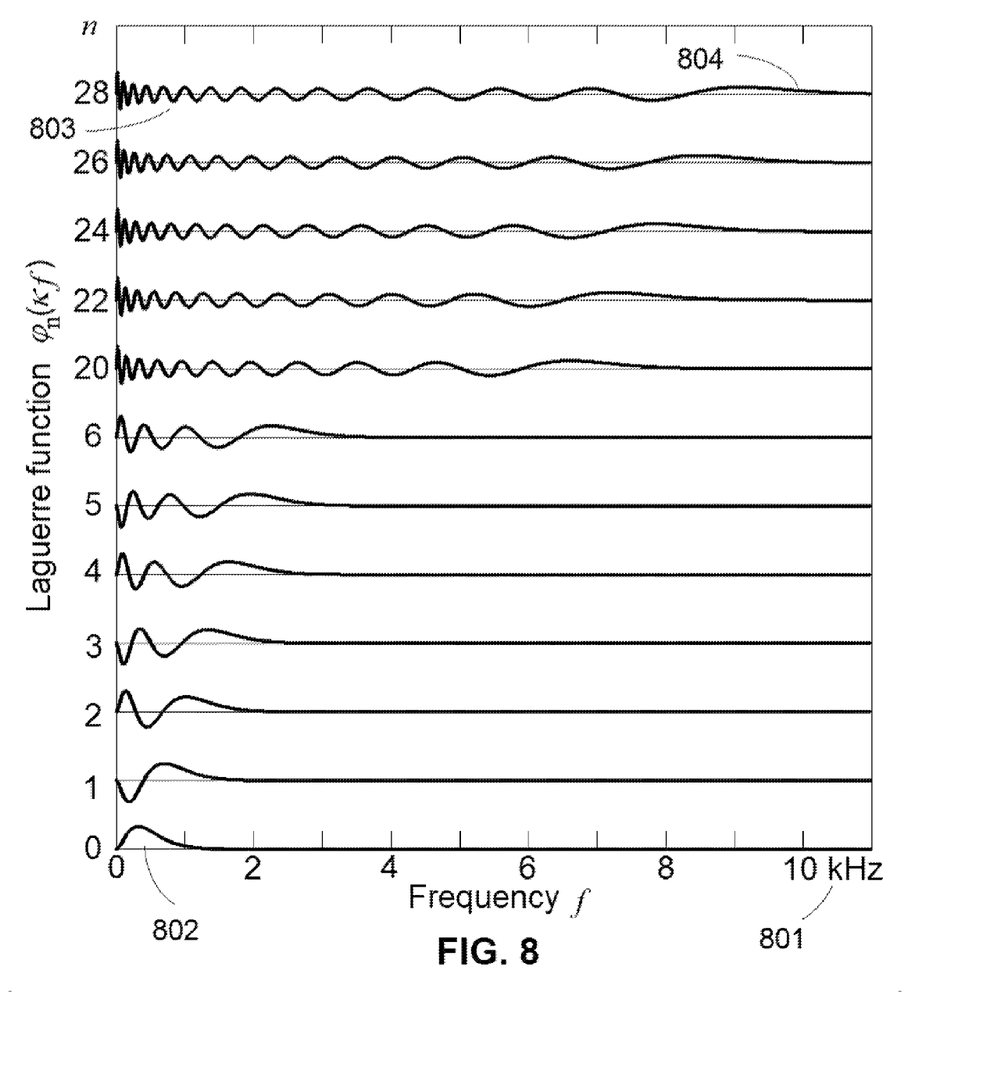
FIG. 8 is a graph of the Laguerre functions.

Laguerre functions, FIG. 8, are defined as $$\Phi_n(x) = \sqrt{\frac{n!}{(n+k)!}} e^{-x/2} x^{k/2} L_n^{(k)}(x),$$

where k is an integer, typically k=0, 2 or 4; and the associated Laguerre polynomials are $$L_n^{(k)}(x) = \frac{e^x x^{-k}}{n!} \frac{d^n}{dx^n}(e^{-x} x^{n+k}).$$

In FIG. 8, the argument of the Laguerre functions is scaled to frequency, 801. The low-order Laguerre functions are concentrated in low-frequency region, 802. For higher-order Laguerre functions, in the low-frequency region, there is an oscillation, 803; and in high-frequency region, there are broad peaks. Therefore, the Laguerre functions closely resembles the frequency-response curve of human ears.

The amplitude spectrum $A(\omega)$ is expanded into Laguerre functions $$A(\omega) = \sum_{n=0}^{N} C_n \Phi_n(\kappa\omega),$$

where the coefficients are calculated by $$C_n = \int_0^\infty \kappa A(\omega) \Phi_n(\kappa\omega) d\omega,$$

and $\kappa$ is a scaling factor to maximize accuracy. The norm of the vector C is the intensity parameter I, $$I = \sqrt{\sum_{n=0}^{N} C_n^2},$$

and the normalized Laguerre coefficients are defined as $$c_n = C_n/I.$$

The amplitude spectrum can be recovered from the Laguerre coefficients. By using sufficient number of Laguerre functions, the accuracy can be sufficientley high, see 703 of FIG. 7.

In addition to the normalized Laguerre coefficients, the voicedness index indicating whether the frame is voiced or unvoiced, the duration of the frame (pitch period for voiced sections), and the intensity of that frame are retained as part of the parameters of a frame. Those parameters are useful in the decoding process, 119.

Figure 9:
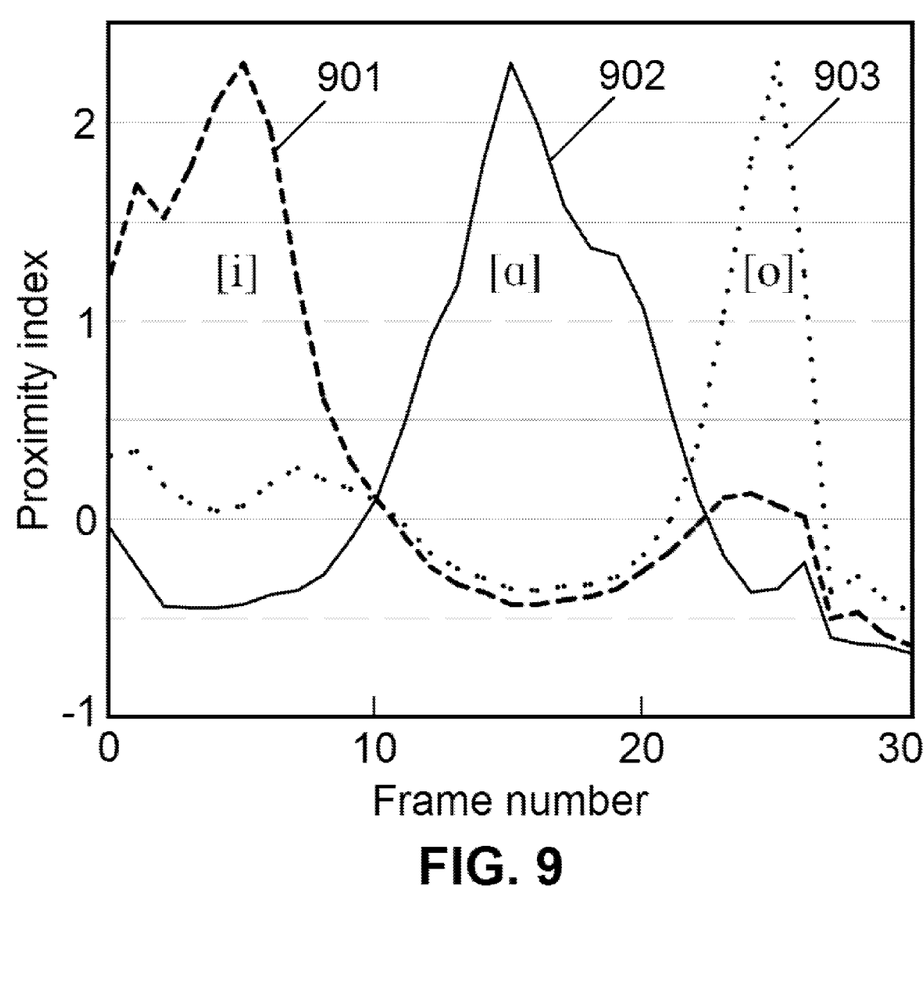
FIG. 9 is an example of the proximity indices.

The pitch-synchronous parametric representation based on timbre vectors represents the timbre of each pitch period. A timbre distance $\delta$ between two frames can be defined as $$\delta = \sum_{n=0}^{N} [c_n^{(1)} - c_n^{(2)}]^2,$$

where $c^{(1)}_n$ and $c^{(2)}_n$ are elements of the two timbre vectors. Experiments have shown that for two timbre vectors of the same phoneme (not diphthong), the distance is less than 0.1. For timbre vectors of different vowels, the distance is 0.1 to 0.6. For a vowel and a consonant, the distance is even greater. A more convenient parameter, the timbre proximity index, can be defined $$P = -\log(\delta + \epsilon),$$

where $\epsilon$ is a small positive number (here $\epsilon=0.1$) to avoid infinity. The timbre proximity index is greater if the two phonemes are similar. FIG. 9 shows an example of the variation of timbre proximity index with the frame index. Showing is a sequence of three IPA phonemes, [iao]. 901 is the variation of P with regard to the base phoneme of [i], 902 is the variation of P with regard to the base phoneme of [a], and 903 is the variation of P with regard to the base phoneme of [o]. Therefore, the phoneme identity of each pitch period can be identified. A speech recognition system of high accuracy can be built based on this method.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

I claim:

1. A method of automatic speech recognition to convert speech signal into text using one or more processors comprising:
    A) segmenting the speech signal into pitch-synchronous frames, wherein for voiced sections each said frame is a single pitch period;
    B) for each frame, equalizing the two ends of the waveform using an ends-matching program;
    C) generating an amplitude spectrum of each said frame using Fourier analysis;
    D) transforming each said amplitude spectrum into a timbre vector using Laguerre functions;
    E) performing acoustic decoding to find a list of most likely phonemes or sub-phoneme units for each said timbre vector by comparing with a timbre vector database;
    F) decoding the sequence of the list of the most likely phonemes or sub-phoneme units using a language-model database to find out the most likely text;
        wherein the segmenting of the speech-signal is based on an analysis of the speech signals using an asymmetric window which includes:
        a) conducting, for a speaker, a test to find the best size of the asymmetric window;
        b) convoluting the speech-signal with the said asymmetric window to form a profile function;
        c) picking up the maxima in the said profile function as segmentation points;
        d) extending the segmentation points to unvoiced sections.

2. The method in claim 1, wherein segmenting of the speech-signal is based on the glottal closure instants derived from simultaneously recorded electroglottograph signals and by analyzing the sections of speech signal where glottal closure signals do not exist.

3. The method in claim 1, wherein the acoustic decoding comprises distinguishing different voiced phonemes by computing a timbre distance between each said timbre vector and the timbre vectors of different voiced phonemes in the timbre vector database.

4. The method in claim 1, wherein the acoustic decoding comprises distinguishing different unvoiced consonants by computing a timbre distance between each said timbre vector and the timbre vectors of different unvoiced consonants in the timbre vector database.

5. The method in claim 1, wherein the different tones in tone languages are identified using the frame durations and the slope of changes in frame durations in the said timbre vectors.

6. The method in claim 1, wherein the timbre vector database is constructed by the steps comprising:
    recording speech-signal by a speaker or a number of speakers reading a prepared text which contains all phonemes of the target language into digital form;
    segmenting the speech signal into pitch-synchronous frames, wherein for voiced sections each said frame is a single pitch period;
    generating amplitude spectra of the said frames using Fourier analysis;
    transforming the said amplitude spectra into timbre vectors using Laguerre functions;
    transcribing the prepared text into phonemes or sub-phoneme units;
    identifying the phoneme of each said timbre vector by comparing with the phonemes or sub-phoneme transcription of the prepared text;
    collecting the pairs of timbre vectors and the corresponding phonemes or sub-phoneme units to form a database.

7. A system of automatic speech recognition to convert speech-signal into text comprising one or more data processing apparatus; and a computer-readable medium coupled to the one or more data processing apparatus having instructions stored thereon which, when executed by the one or more data processing apparatus, cause the one or more data processing apparatus to perform a method comprising:
    A) segmenting the speech signal into pitch-synchronous frames, wherein for voiced sections each said frame is a single pitch period;
    B) for each frame, equalizing the two ends of the waveform using an ends-matching program;
    C) generating an amplitude spectrum of each said frame using Fourier analysis;
    D) transforming each said amplitude spectrum into a timbre vector using Laguerre functions;
    E) performing acoustic decoding to find a list of most likely phonemes or sub-phoneme units for each said timbre vector by comparing with a timbre vector database;
    F) decoding the sequence of the list of the most likely phonemes or sub-phoneme units using a language-model database to find out the most likely text;
        wherein the segmenting of the speech-signal is based on an analysis of the speech signals using an asymmetric window including:
        a) conducting, for a speaker, a test to find the best size of the asymmetric window;
        b) convoluting the speech-signal with the said asymmetric window to form a profile function;
        c) picking up the maxima in the said profile function as segmentation points;
        d) extend the segmentation points to unvoiced sections.

8. The system in claim 7, wherein segmenting of the speech-signal is based on the glottal closure instants derived from simultaneously recorded electroglottograph signals and by analyzing the sections of speech signal where glottal closure signals do not exist.

9. The system in claim 7, wherein the acoustic decoding comprises distinguishing different voiced phonemes by computing a timbre distance between each said timbre vector and the timbre vectors of different voiced phonemes in the timbre vector database.

10. The system in claim 7, wherein the acoustic decoding comprises distinguishing different unvoiced consonants by computing a timbre distance between each said timbre vector and the timbre vectors of different unvoiced consonants in the timbre vector database.

11. The system in claim 7, wherein the different tones in tone languages are identified using the frame durations and the slope of changes in frame durations in the said timbre vectors.

12. The system in claim 7, wherein the timbre vector database is constructed by the steps comprising:
- recording speech-signal by a speaker or a number of speakers reading a prepared text which contains all phonemes of the target language into digital form;
- segmenting the speech signal into pitch-synchronous frames, wherein for voiced sections each said frame is a single pitch period;
- generating amplitude spectra of the said frames using Fourier analysis;
- transforming the said amplitude spectra into timbre vectors using Laguerre functions;
- transcribing the prepared text into phonemes or sub-phoneme units;
- identifying the phoneme of each said timbre vector by comparing with the phonemes or sub-phoneme transcription of the prepared text;
- collecting the pairs of timbre vectors and the corresponding phonemes or sub-phoneme units to form a database.

\* \* \* \* \*